(12) United States Patent
Kim

(10) Patent No.: US 8,436,275 B2
(45) Date of Patent: May 7, 2013

(54) LASER IRRADIATION APPARATUS AND METHOD FOR SEALING ORGANIC LIGHT EMITTING DIODE USING THE LASER IRRADIATION APPARATUS

(75) Inventor: Kil-Joo Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 13/088,939

(22) Filed: Apr. 18, 2011

(65) Prior Publication Data

US 2012/0064793 A1 Mar. 15, 2012

(30) Foreign Application Priority Data

Sep. 15, 2010 (KR) .................. 10-2010-0090614

(51) Int. Cl.
*B23K 26/00* (2006.01)
*B23K 26/02* (2006.01)

(52) U.S. Cl.
USPC ................. 219/121.65; 219/121.78

(58) Field of Classification Search ... 219/121.6–121.82
See application file for complete search history.

(56) References Cited

U.S. PATENT DOCUMENTS 5,109,148 A * 4/1992 Fujita et al. .............. 219/121.82
5,340,962 A * 8/1994 Schmidt et al. .......... 219/121.78

FOREIGN PATENT DOCUMENTS

| KR | 10-2007-0078501 A | 8/2007 |
|---|---|---|
| KR | 10-2007-0088682 A | 8/2007 |
| KR | 10-0837617 B1 | 6/2008 |

* cited by examiner

*Primary Examiner* — Sang Paik
(74) *Attorney, Agent, or Firm* — Knobbe, Martens, Olson & Bear LLP

(57) ABSTRACT

A laser irradiation apparatus is disclosed. In one embodiment, the apparatus includes i) an X-axis location control board configured to move a plurality of drivers in an X-axis direction and ii) a plurality of output heads cooperatively arranged with the drivers and configured to move with movement of the drivers, wherein the output heads are configured to receive laser beams. The apparatus may further include a Z-axis location control board cooperatively arranged with the X-axis location control board and configured to move the X-axis location control board in an Z-axis direction, wherein the output heads alternatively protrude with different lengths along an Y-axis direction.

8 Claims, 5 Drawing Sheets

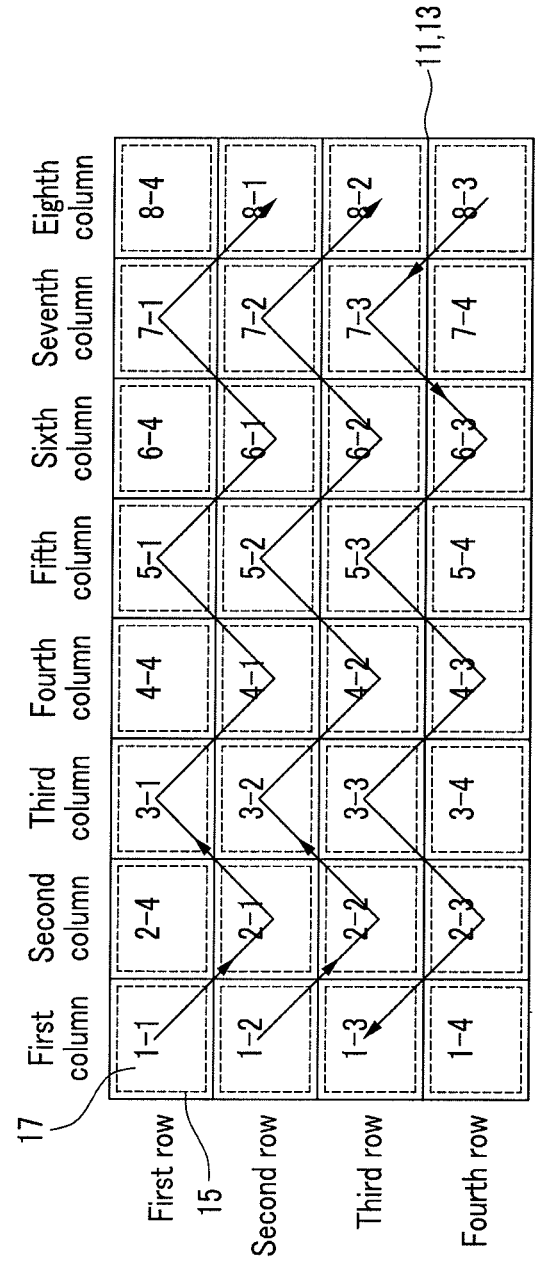

LASER IRRADIATION APPARATUS AND METHOD FOR SEALING ORGANIC LIGHT EMITTING DIODE USING THE LASER IRRADIATION APPARATUS

RELATED APPLICATION

This application claims priority to and the benefit of Korean Patent Application No. 10-2010-0090614 filed in the Korean Intellectual Property Office on Sep. 15, 2010, the entire contents of which are incorporated herein by reference.

BACKGROUND

1. Field

The described technology generally relates to a laser irradiation apparatus and a sealing method of an organic light emitting display element using the same.

2. Description of the Related Technology

In general, an organic light emitting display element is most widely used among organic semiconductor elements, and has a relatively simple structure. The organic display element is self-emissive unlike a liquid crystal display (LCD), and thus it does not require an additional back light so that an organic light emitting diode (OLED) display has advantages of a slim thickness and a reduced weight. Thus, recently, the OLED display has been actively developed as a display panel of portable data terminals such as mobile computers, portable cellular phones, portable game devices, electronic books.

SUMMARY

One aspect is a laser irradiation apparatus that can shorten a sealing process time of the organic light emitting display element and a sealing method of the organic display element using the same.

Another aspect is a laser irradiation apparatus that can easily correspond to variation of a cell size of an organic light emitting display element by arranging output heads of the laser irradiation apparatus in a zigzag form, and a sealing method of the organic display element using the same.

Another aspect is a laser irradiation apparatus which includes: an X-axis location control board configured to move a plurality of drivers in an X-axis direction; a plurality of output heads cooperatively arranged with the drivers and configured to move with movement of the drivers, wherein the output heads are configured to receive laser beams; and a Z-axis location control board cooperatively arranged with the X-axis location control board and configured to move the X-axis location control board in an Z-axis direction. The output heads alternatively protrude with different lengths along an Y-axis direction.

The output heads are arranged in a zigzag form in the X-axis location control board along the Y-axis direction.

The drivers and the output heads may be respectively connected with each other by brackets, and the brackets may protrude toward the Y-axis direction with different lengths for each alternation corresponding to the plurality of output heads.

The brackets and the drivers may be fixed by a holder assembly. The holder assembly may include a first holder connected to the bracket and a second holder combined to the first holder and fixing the output heads.

The first holder may be mounted in the shape of a plate extended along the Z-axis direction, and one side thereof may be connected with the bracket and the second holder may be mounted on the other side.

The second holder may protrude to the first holder and a penetration hole may be formed in the second holder for insertion fixing of the output heads.

Another aspect is a sealing method of an organic light emitting diode (OLED) display which includes: (a) providing a first substrate including a pixel area where an organic electric field light emitting element is formed and a non-pixel area; (b) providing a second substrate attached on one area including the pixel area of the first substrate; (c) forming frits arranged in a plurality of rows and columns along the periphery area of the second substrate corresponding to the non-pixel area of the first substrate; (d) forming a sealant in the second substrate of an external side of the frit; (e) attaching the first and second substrates to each other and hardening the sealant; (e) attaching the first and second substrates to each other and hardening the sealant; (g) applying the laser beam to the next row of the frit by changing a direction to a vertical direction of the frit when laser beam irradiation to the row direction of the frit in step of (f) is terminated.

BRIEF DESCRIPTION OF THE DRAWINGS

FIG. 5 shows a laser beam irradiation to organic light emitting display elements arranged in a plurality of rows and a plurality of columns.

DETAILED DESCRIPTION

Figure 1:
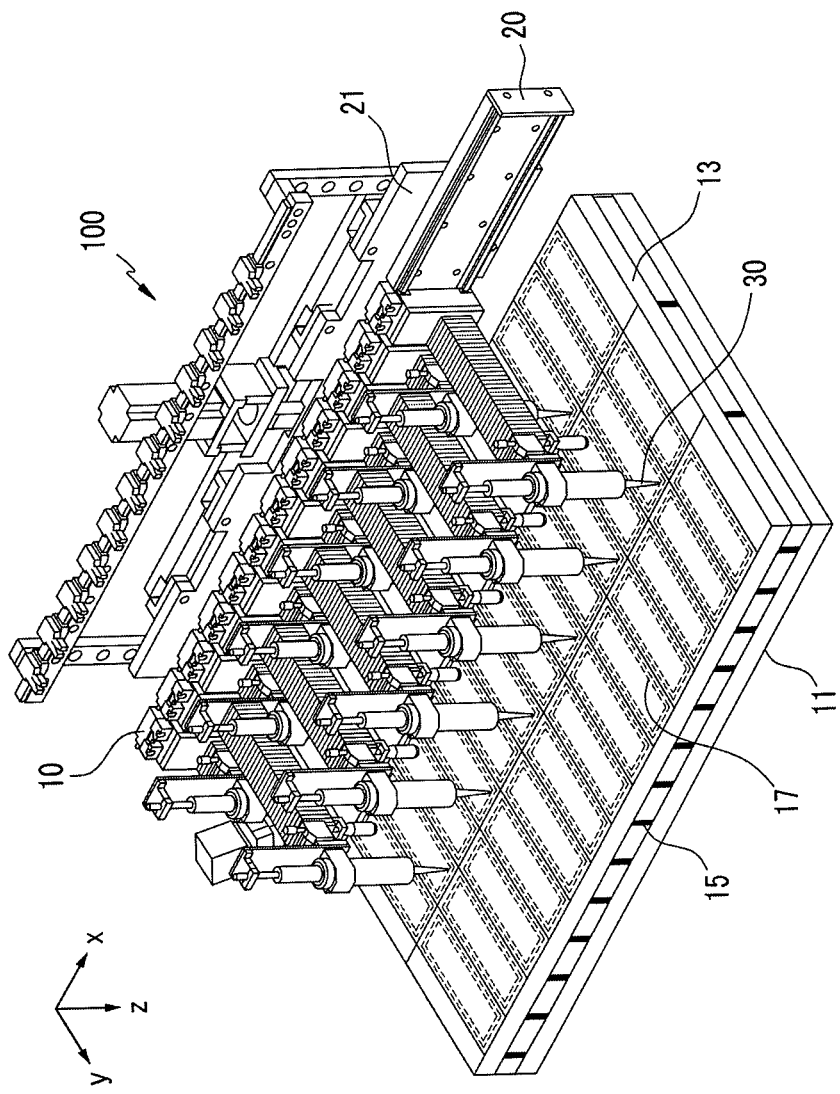
FIG. 1 is a diagram of a laser irradiation apparatus according to an embodiment.

When moisture or oxygen is introduced into an organic light emitting element, the life span of the element is reduced due to oxidation or exfoliation of an electrode material, light efficiency is deteriorated, and color fidelity degrades.

Therefore, a sealing treatment is typically performed to isolate an element and prevent moisture from being introduced in the organic light emitting display element in the manufacturing process. For sealing treatment of the display element, a sealing method that coats a frit on a glass substrate is used.

When the display element is sealed using the frit, the frit is coated on a sealing portion of each of the organic display elements, a laser beam is irradiated to the sealing portion of the element using an output head of a laser irradiation apparatus, and then the frit is hardened.

Here, when the cell size of the display element is increased, output heads of the laser irradiation apparatus should maintain a large gap therebetween corresponding to the cell size.

However, the output heads of the laser irradiation apparatus are arranged in one line and thus interference may be generated when the gap between the output heads is increased more than a predetermined distance, and therefore it is difficult to increase the gap between the output heads greater than a predetermined distance. Accordingly, when the cell size of the organic light emitting display element becomes greater than a predetermined size, the hardening of the frit using the laser irradiation apparatus cannot be smoothly performed.

Hereinafter, embodiments will be described with reference to the accompanied drawings. As those skilled in the art would realize, the described embodiments may be modified in various different ways.

In addition, the size and thickness of each component shown in the drawings may be arbitrarily shown for understanding and ease of description. In the drawings, the thickness of layers, films, panels, regions, etc. may be exaggerated for clarity.

FIG. 1 schematically shows a laser irradiation apparatus according to an embodiment.

Hereinafter, the present embodiment is applied to a sealing process of an organic light emitting diode (OLED) display, but it may be applied to other display devices that use sealing of a plurality of glass plates.

As shown in FIG. 1, a plurality of organic light emitting display elements 17 are disposed on a first substrate 11 and a second substrate 13. In addition, a sealing member 15 seals the first and second substrates 11 and 13 to prevent foreign particles from being introduced into the display elements 17. In one embodiment, the sealing member 15 is doped with one or more transition metal and thus an absorption characteristic with respect to a specific wavelength is enforced so that it can be easily softened. In the present embodiment, the sealing member 15 may be formed with a frit. Hereinafter, the sealing member and the frit use the same reference numeral 15.

A plurality of output heads 30 are disposed on the substrates 11 and 13 to irradiate laser beams to the sealing member 15 such that the first substrate 11 and the second substrate 13 are sealed. Hereinafter, a configuration of the laser irradiation apparatus 100 according to the embodiment will be described in further detail.

As shown in FIG. 1, the laser irradiation apparatus 100 includes an X-axis location control board 20 on which a plurality of driving units 10 are slidably mounted, the output heads 30 coupled to the driving units 10 and slid with movement of the driving units 10 and to which laser beams are irradiated, and a Z-axis location control board 21 coupled with the X-axis location control board 20 and moving the X-axis location control board 20 to the Z-axis direction.

The X-axis location control board 20 is formed extending along the X-axis direction, and enables the driver 10 to move a length direction thereof. In addition, the Z-axis location control board 21 is coupled to the X-axis location control board 20 using a ball screw. The Z-axis location control board 21 controls a location of the X-axis location control board 20, and the plurality of output heads 30 are substantially simultaneously focused such that laser beams with substantially uniform density can be irradiated.

Figure 2:
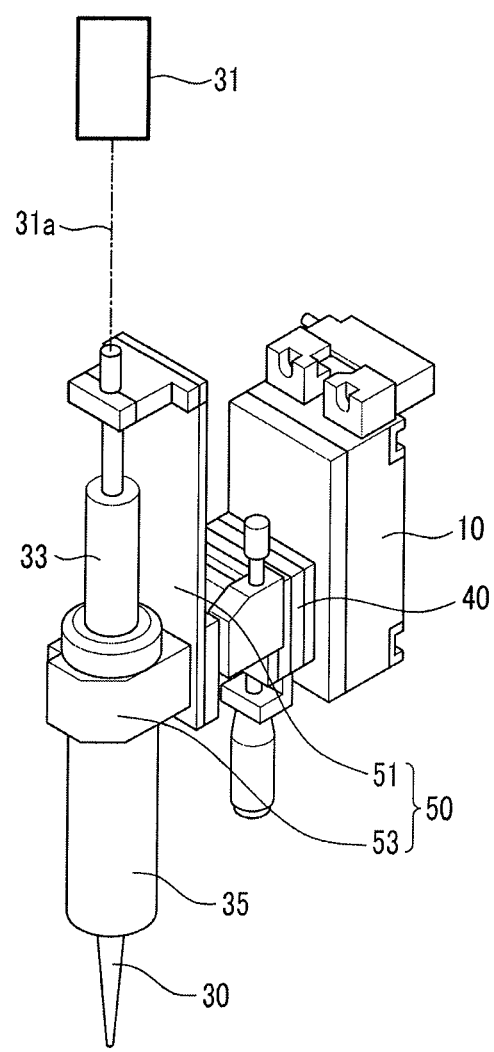
FIG. 2 schematically shows an output head portion of FIG. 1 in the mounted state.

FIG. 2 shows the output heads of FIG. 1 in the mounted state.

As shown in FIG. 2, the output head 30 receives an output for irradiation of a laser beam 31a through a laser oscillation unit 31 and irradiates the laser beam 31a.

Hereinafter, irradiation of the laser beam 31a through the output head 30 will be described in further detail.

The laser beam 31a is irradiated from the laser oscillation unit 31.

In addition, the irradiated laser beam 31a is incident on flexible channels 33. The flexible channels 33 refer to beam path members, and the laser beam 31a is input to one end and output operation is performed through the other end. In one embodiment, the laser beam 31a is passed through a plurality of lenses (not shown) before being incident on the flexible channels 33 to make the laser beam 31a enter to the flexible channel 33 by substantially uniforming the density of the laser beam 31a. The laser beam 31a output from the flexible channel 33 is finally irradiated in the output head 30.

The output head 30 irradiates the laser beam 31a to a region to which the substrates 11 and 13 of the OLED display are to be sealed. A condenser lens 35 is mounted on the output head 30 so that the laser beam 31a output from the flexible channels 33 can be substantially uniformly condensed. For this, the condenser lens 35 may include a convex lens. The output heads 30 can be movably mounted on the X-axis location control board 20.

Combination of the output head 30 and the X-axis location control board 20 will now be described in further detail.

In one embodiment, the driver 10 is sildably mounted on the X-axis location control board 20 by motor driving. In one embodiment, the driver 10 is mounted as a linear motor for movement on the X-axis location control board 20 without vibration. The driver 10 can be individually driven for distance control between the output heads 30. In addition, a holder assembly 50 is connected to the driver 10 using brackets 40 and 40a.

Figure 3:
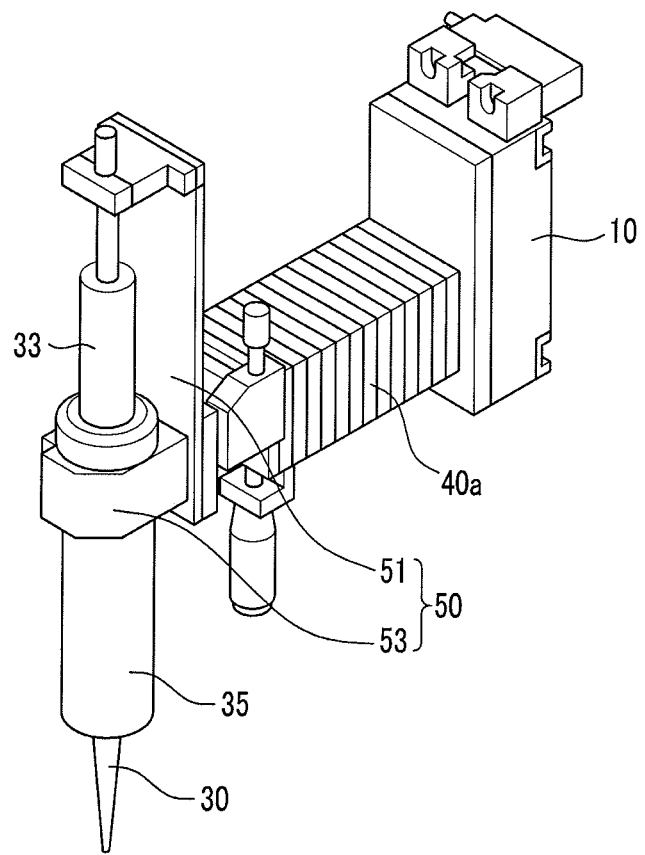
FIG. 3 shows a protruded state of the output head portion of FIG. 1 to a length direction of a bracket.

FIG. 3 shows the output head of FIG. 1 in the protruding state along a length change of the bracket.

As shown in FIG. 2 and FIG. 3, the holder assembly 50 includes a first holder 51 connected with the brackets 40 and 40a and a second holder 53 coupled to the first holder 51 and fixing the output head 30. The first holder 51 is directly connected to the brackets 40 and 40a forms a plate shape. The second holder 53 is mounted on the first holder 51 and fixes the output head 30. In one embodiment, the second holder 53 includes a penetration hole (not shown) and the condenser lens 35 is inserted to the penetration hole such that the output head 30 can be fixed.

Protruded lengths of the holder assemblies 50 in the respective drivers 10 may be different from each other through the length adjustment of the brackets 40 and 40a. In one embodiment, as shown in FIG. 1, the length of an even-numbered bracket 40a among the brackets 40 and 40a is longer by a predetermined length than that of an odd-numbered bracket 40. In this embodiment, an even-numbered output head 30 protrudes further to the Y-axis direction than an odd-numbered output head 30 among the output heads 30. In one embodiment, as shown in FIG. 1, the output heads 30 are disposed in a substantially zigzag form. As the output heads 30 are arranged in the zigzag form, the distance between the output heads 30 may be freely set. That is, when the output heads 30 are disposed in one line as in a typical alignment, interference is generated between adjacent output heads 30 so that a gap greater than a predetermined distance cannot be maintained therebetween. However, as in the present embodiment, the distance between the output heads 30 can be easily controlled when the output heads 30 are arranged in substantially the zigzag form. Thus, the distance between the output heads 30 can be controlled substantially corresponding to the size of a cell in the organic light emitting display element so that the sealing time of the substrates 11 and 13 can be shortened, thereby shortening a manufacturing time of the OLED display.

Figure 4:
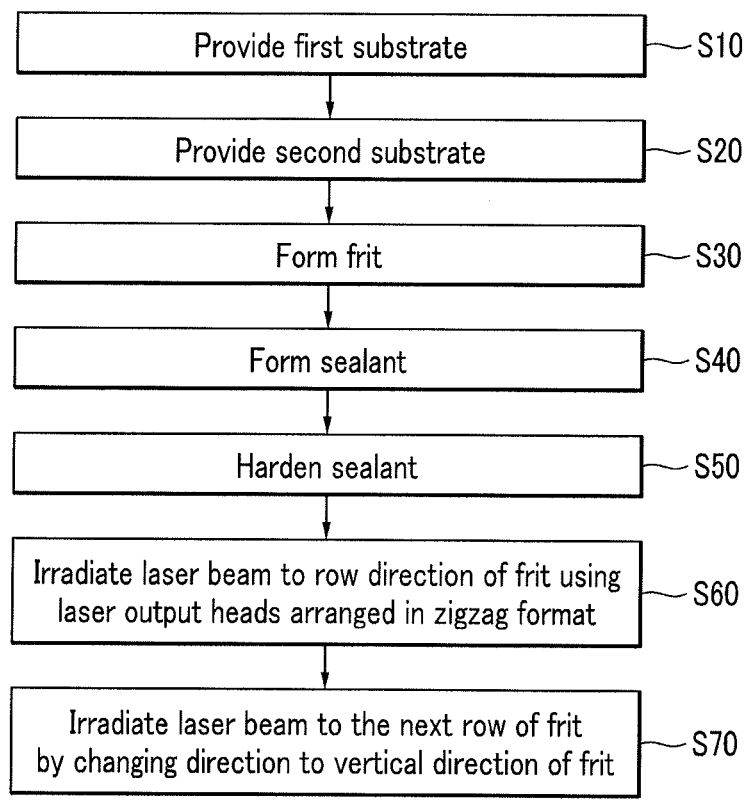
FIG. 4 is a flowchart of a sealing method of an organic light emitting diode (OLED) display according to an embodiment.

FIG. 4 is a flowchart of a sealing method of an organic light emitting diode (OLED) display according to an embodiment, and FIG. 5 schematically shows irradiation of a laser beam to organic light emitting display elements arranged in a plurality of rows and a plurality of columns.

Referring to FIG. 4 and FIG. 5, a sealing method of the OLED display will now be described in further detail.

First, a first substrate 11 including a pixel area where an organic light emitting element 17 is formed and a non-pixel area is provided (S10). The pixel area is a portion where a display screen is displayed, and the non-pixel area is all the portions excluding the pixel area.

Next, a second substrate 13 attached on an area including the pixel area is provided (S20). Here, the first substrate 11 is a lower substrate and the second substrate 13 is an upper substrate.

Frits 15 arranged in a plurality of rows and columns are formed along a periphery area of the second substrate 13 substantially corresponding to the non-pixel area of the first substrate 11 (S30). The frits 15 prevent foreign particles from being introduced into the organic light emitting display element 17.

A sealant is formed in the second substrate 13 at an external side of the frit 15 (S40).

Next, the first substrate 11 and the second substrate 13 are attached to each other and the sealant is hardened (S50).

Subsequently, a plurality of output heads 30 of a laser irradiation apparatus 100 are arranged in a substantially zigzag direction corresponding to the frits 15 in step of S30, and a laser beam is irradiated to the row direction of the frit 15 (S60).

Step S60 will be described in further detail with reference to FIG. 5. In FIG. 5, organic light emitting display elements 17 are arranged in a plurality of rows and a plurality of columns in the substrates 11 and 13.

First, the output heads 30 of the laser irradiation apparatus 100, arranged in the substantially zigzag shape are placed corresponding to the organic light emitting display elements of FIG. 5, arranged in the rows and columns.

The output heads 30 of the laser irradiation apparatus 100 move along the row direction and irradiate laser beams to the frits of the organic light emitting display elements. Here, since the output heads 30 are arranged in the substantially zigzag direction according to the present embodiment, locations of the output heads 30 can be smoothly controlled without generating interference between the output heads 30 when controlling distances between the output heads 30 corresponding to the size of the organic light emitting display element.

When the irradiation of the laser beam to the row direction of the frit 15 is terminated (S60), the laser beam is irradiated to the next row of the frit 15 by changing the irradiation direction to a substantially vertical direction of the frit 15 (S70). Accordingly, a laser beam 31a can be irradiated to the frit 15 without an influence depending on the size of a cell of the organic light emitting display element so that a manufacturing time of the OLED display can be shortened. In the above-stated embodiments, the output heads 30 can move and irradiate the laser beam to the frits 15 while the substrates 11 and 13 are fixed, and the substrates 11 and 13 can move and the laser beam 31a can be irradiated to the frits 15 while the output heads 30 are fixed. When the substrates 11 and 13 are moving, a stage (not shown) for the movement may be mounted on a lower portion of the substrates 11 and 13.

According to at least one of the disclosed embodiments, the output heads of the laser irradiation apparatus are arranged in a substantially zigzag form so that the gap between the output heads can be controlled without an interference of the output heads, and accordingly hardening of the frit can be smoothly performed corresponding to a cell size of the organic light emitting display element.

Embodiments have been described with reference to the accompanied drawings. It is to be understood that the disclosed embodiments are not considered limiting, and are intended to cover various modifications and equivalent arrangements included within the spirit and scope of the appended claims.

What is claimed is:

1. A laser irradiation apparatus comprising:
an X-axis location control board configured to move a plurality of drivers in an X-axis direction;
a plurality of output heads cooperatively arranged with the drivers and configured to move with movement of the drivers, wherein the output heads are configured to receive laser beams;
a Z-axis location control board cooperatively arranged with the X-axis location control board and configured to move the X-axis location control board in an Z-axis direction; and
a plurality of brackets interconnecting the drivers and the output heads, wherein the brackets comprise at least two neighboring brackets which have different lengths measured in the Y-axis direction.

2. The laser irradiation apparatus of claim 1, wherein the output heads are arranged in a substantially zigzag form along the Y-axis direction.

3. The laser irradiation apparatus of claim 1, wherein the brackets comprise even-numbered ones and odd-numbered ones, and wherein the length of a selected even-numbered bracket is greater than that of a selected odd-numbered bracket.

4. The laser irradiation apparatus of claim 1, wherein the brackets and drivers are fixed by a holder assembly.

5. The laser irradiation apparatus of claim 4, wherein the holder assembly comprises a first holder connected to the bracket and a second holder connected to the first holder and fixing the output heads.

6. The laser irradiation apparatus of claim 5, wherein the first holder is mounted in the shape of a plate extended along the Z-axis direction, and wherein one side thereof is connected with the bracket and the second holder is mounted on the other side.

7. The laser irradiation apparatus of claim 5, wherein the second holder protrudes to the first holder and wherein a penetration hole is formed in the second holder for insertion fixing of the output heads.

8. The laser irradiation apparatus of claim 1, wherein the brackets comprise even-numbered ones and odd-numbered ones, and wherein the length of the even-numbered brackets is greater than that of the odd-numbered brackets.

* * * * *